Feb. 14, 1961 L. E. AUSTIN ET AL 2,971,252
BRAKE ASSEMBLY MECHANISM
Filed Oct. 17, 1957 3 Sheets-Sheet 1
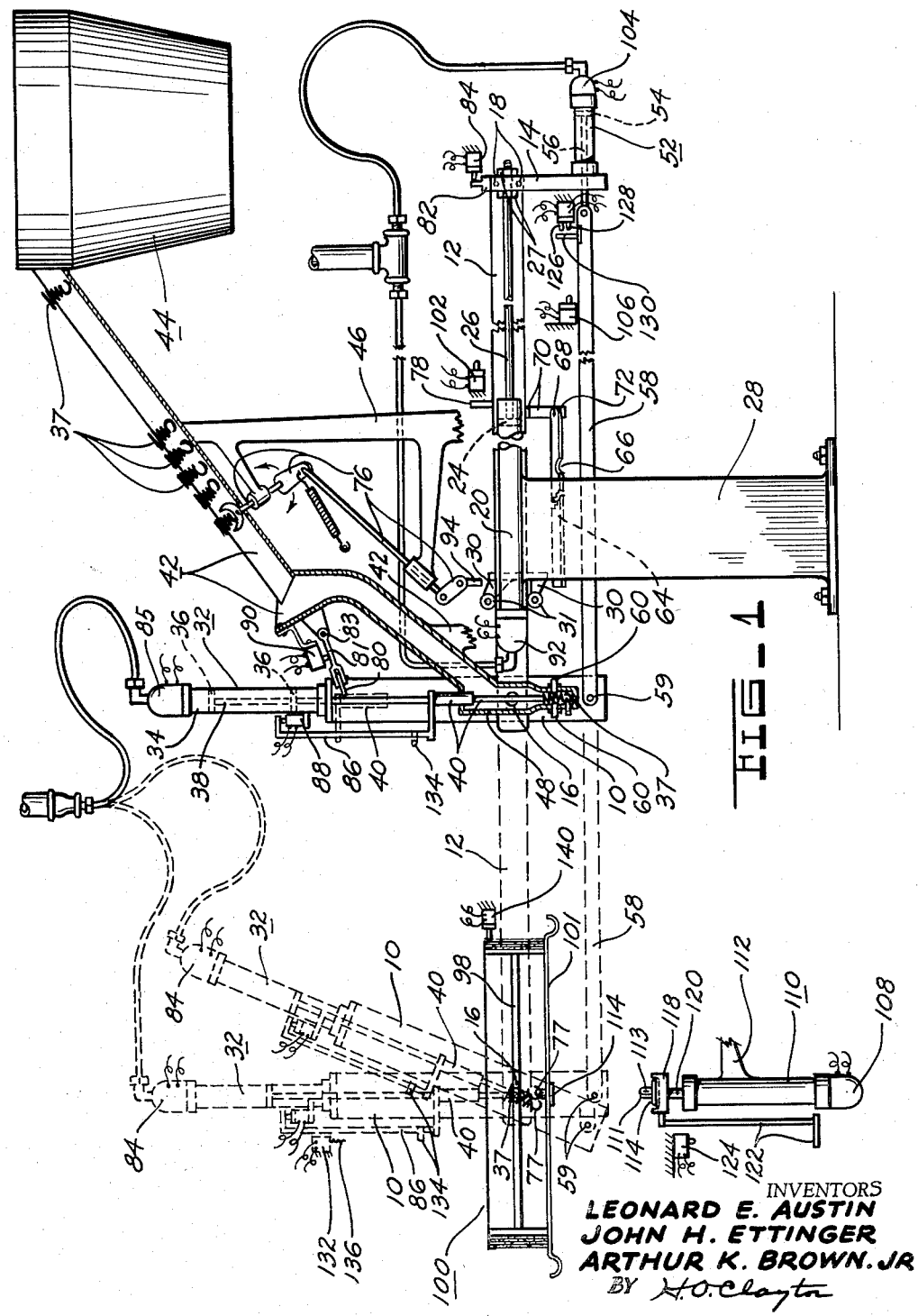
INVENTORS
LEONARD E. AUSTIN
JOHN H. ETTINGER
ARTHUR K. BROWN, JR.
BY H.O. Clayton
ATTORNEY.

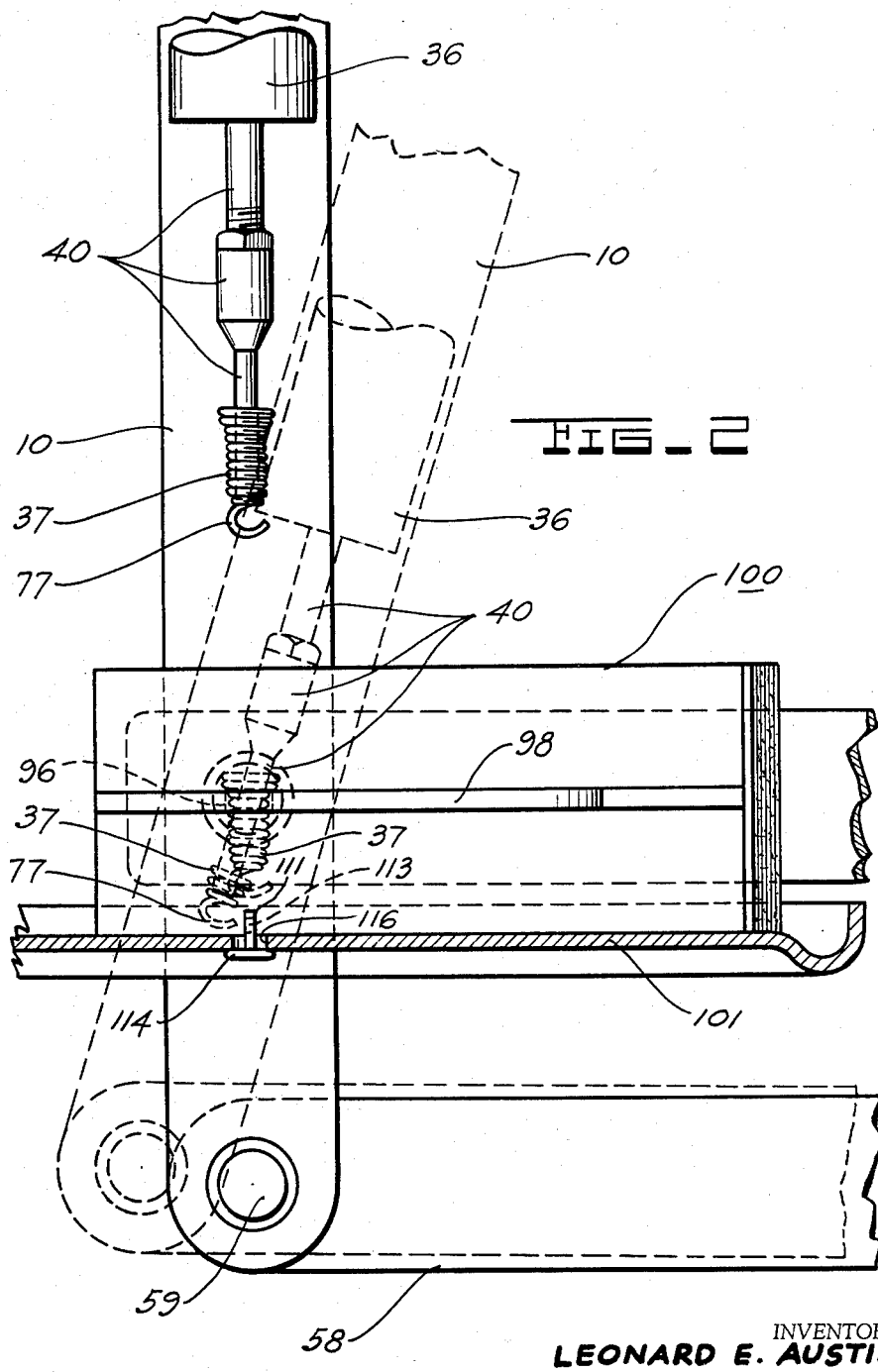

Feb. 14, 1961  L. E. AUSTIN ET AL  2,971,252
BRAKE ASSEMBLY MECHANISM
Filed Oct. 17, 1957  3 Sheets-Sheet 3
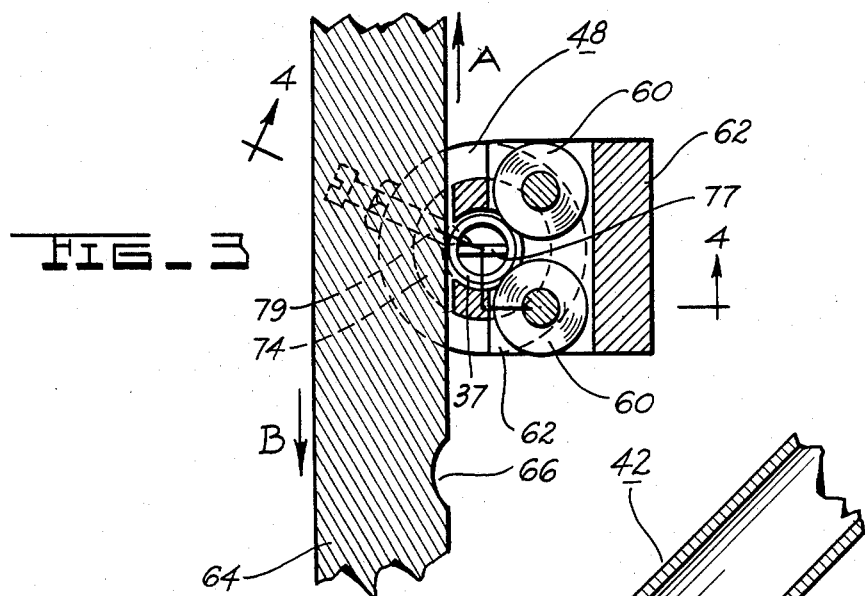
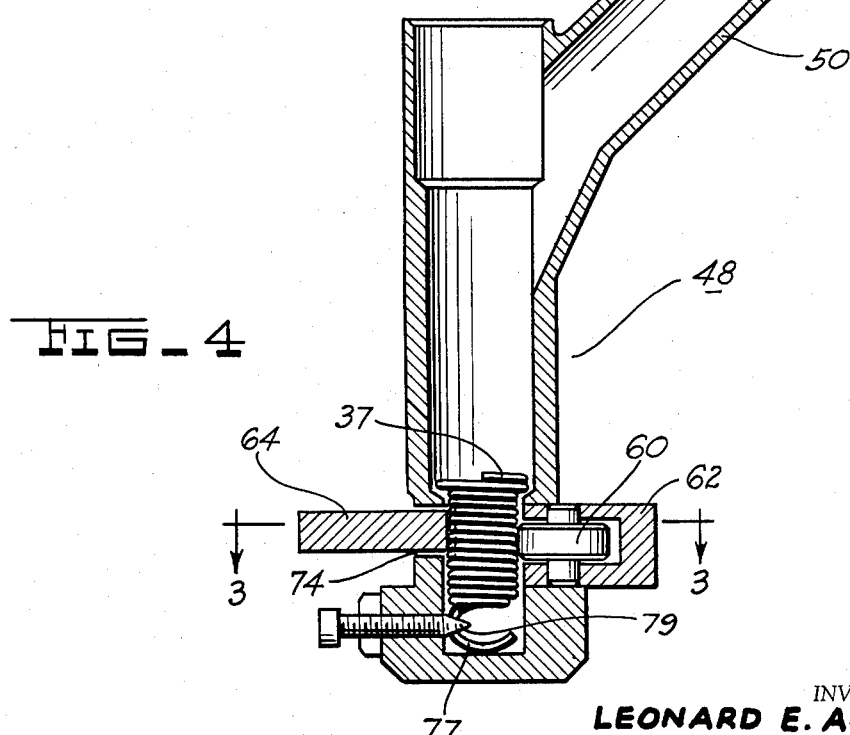
INVENTORS
LEONARD E. AUSTIN.
JOHN H. ETTINGER.
ARTHUR K. BROWN. JR.
BY
ATTORNEY.

United States Patent Office 2,971,252
Patented Feb. 14, 1961

---

2,971,252

BRAKE ASSEMBLY MECHANISM

Leonard E. Austin, John H. Ettinger, and Arthur K. Brown, Jr., South Bend, Ind., assignors to The Bendix Corporation, a corporation of Delaware Filed Oct. 17, 1957, Ser. No. 690,839

13 Claims. (Cl. 29—211)

Many products, such for example as automotive brakes, are made up of a multiplicity of parts and this invention relates to an assembling mechanism having power operated means for incorporating in the product two of said parts in the operation of assembling the several parts to effect the finished product.

Now many automotive brakes include, in their structure, a plurality of hold-down coil springs operative to hold the brake shoes under pressure against the backing plate. These springs are, in the brakes, positioned between the web of the brake shoe and the backing plate and include a hook shaped end portion adapted to be connected to anchor means mounted in the backing plate. It is an object of our invention to provide an assembling machine having a power operated mechanism automatically operable, with no manual effort on the part of the attendant, to, in successive steps, pick up one of the aforementioned springs, move it to a position immediately adjacent its ultimate position in the brake unit, insert it into and then properly position it in an opening in the web of a brake shoe of the unit, insert an anchor member in the backing plate of the unit, then interconnect the anchor member and spring, and lastly orient another spring to be incorporated in the brake in the next cycle of operation.

Yet another object of our invention is, in the incorporation of a brake hold-down spring and its anchor in an automotive brake, to provide a power operated mechanism for automatically picking up the hold-down spring, said spring having been previously oriented by the mechanism to position a hook portion of the spring in a certain position, then positioning the oriented spring over an opening in a brake shoe web, then inserting the spring in said opening, then angularly moving the spring to a certain position to facilitate its being later coupled with the anchor member, then inserting the anchor member in an opening in the backing plate of the brake, and then bodily moving the spring to interconnect the aforementioned hook and anchor and spring having been previously stretched by the mechanism to insure its operation of drawing the shoe web toward the body plate.

A further object of our invention is, in the operation of assembling into a unit the parts of an automotive brake, to incorporate, in said unit, a coil type tubular shaped hold-down spring having at least one relatively large diametered coil at its top portion and which is provided with a hook-shaped end portion fittable with an eye portion of an anchor member of the unit.

An important feature of the above discussed mechanism lies in that part of the mechanism for orienting the hold-down spring so as to facilitate its connection with the anchor member of the brake unit.

Other objects of the invention and desirable details of construction of parts will become apparent from the following detailed description of certain illustrative embodiments of the invention, taken in conjunction with the accompanying drawings illustrating said embodiments in which:

Figure 1 discloses, in side elevation, the brake assembly mechanism constituting our invention;

Figure 2 discloses a portion of the mechanism of Figure 1, said mechanism at the time being operative to interconnect the hold-down spring and anchor member;

Figure 3 discloses, in section, details of the orientor unit of our invention, said unit housing the hold-down spring; and Figure 4 is a section, taken on the line 4—4 of Figure 3, disclosing other details of said orientor unit.

Referring to Figure 1 disclosing a preferred embodiment of the hold-down spring and anchor assembly mechanism of our invention, a three-part frame structure, comprising an angle iron shaped member 10, a relatively long rectangularly shaped frame member 12 and a relatively short rectangularly shaped frame member 14, is bodily movable as a unit by the power means described hereinafter. The angle iron shaped member 10 is pivotally mounted, at 16, to the frame member 12 and the frame member 14 is fixedly, secured to the member 12 by bolts 18; and is spaced therefrom a relatively short distance.

The three-part frame is bodily moved either to the right or left by a double acting fluid pressure motor 20 having a double ended cylinder and a piston 24 the latter being detachably connected, by a rod 26 and nuts 27, to the frame member 14. The cylinder of the motor 20 is fixedly mounted on a standard 28; and guide members 30, secured to said standard, serve both as a guide and a support for the frame member 12 in its movement to the right and left, Figure 1. Rollers 31 on the guide members 30 facilitate this movement of the member 12.

A double acting fluid pressure motor 32, having a cylinder member 34 mounted on the top portion of the angle iron shaped frame member 10 and a piston 36, serves to pick up springs 37 being processed. The piston 36 is connected, by a rod 38, to a two diametered mandrel portion 40. A two part chute 42, fixedly mounted on standards 42 and 46, is shaped to receive, from a hopper 44, the springs being processed; and to the lower end of said chute there is fixedly secured a cup shaped orientor member 48 disclosed in detail in Figure 4. The lower end of the small bodied portion of the mandrel 40 is adapted, with an energization of the motor 32, to move into and out of the orientor 48 to pick up the springs. The lower end portion 50 of the chute is, in Figure 4, shown rotated 90° for the purpose of clarity of disclosure.

The cylinder portion of a double acting fluid pressure motor 52 is mounted on the lower end of the frame member 14; and the piston 54 of said motor is pivotally connected, by means of a rod 56, to a rod 58 which is pivotally connected at 59 to the base of the frame member 10.

One of the important features of our invention lies in means for orienting the springs 37 housed within the base portion of the orientor member 48; and this means includes two rollers 60, Figures 3 and 4, rotatably mounted in a bearing member 62 mounted in a notched out portion in the base of the orientor member 48. The diameter of the bore of the orientor member is, at the base of said member, greater than the diameter of the spring 37; accordingly said spring will, as disclosed in Figures 3 and 4, readily drop into the cup shaped end of the member 48 after leaving the chute. A rectangular shaped bar 64, having a crescent shaped notch 66 adjacent one end thereof, is pivotally secured, at 68, to an angle iron 70 having its upper portion, Figure 1, fixedly secured to the frame member 12. A coil spring 72, Figure 1, serves to bias the bar 64 into engagement with the spring 37 thereby forcing said spring into a relatively tight frictional engagement with the rollers 60. The bar 64 slides, with the bodily movement of the frame structure, within a notch 74 in the member 48 registering its notch 66 with the bore of the member 48 to facilitate the dropping, by gravity, of a spring into said member; and upon the return stroke of the frame with its bar the latter operates, by virtue of its frictional contact with the spring, to rotate said spring about its longitudinal axis until a hook portion 77 on its end contacts a stop 79 adjustably mounted in the base of the orientor 48. The hook 77 now lies in a plane which is parallel or substantially parallel with the plane of the bottom portion of the frame member 10; and said hook is lined up to register with the eye portion of the anchor member to be referred to hereinafter.

The hold-down springs 37 are, one at a time, dropped into the orientor member 48 by means of an escapement mechanism disclosed in Figure 1. This mechanism includes linkage 76 mounted on the standard 46 a lever portion at the base of said linkage being actuated by a thrust arm 78 fixedly mounted on the frame member 12.

Describing now the operation of the mechanism of our invention, and incidentally describing those parts of said mechanism not heretofore described, it will be assumed that the parts of the mechanism are just before initiating the operation of the mechanism, in the full line positions disclosed in Figure 1. In this position of the parts a spring biased crank arm 80, as will be described more fully hereinafter, has been rotated out of the path of the large diametered portion of the mandrel 40; a spring unit 37 is housed within the orientor 48; the frame structure and the motors 32 and 52 secured thereto have been moved, by the operation of the motor 20, to their rightward position; and a thrust member 82 fixedly mounted on the end of the frame member 12 has closed a fixedly mounted normally open electrical switch 84. The arm 80 is pivotally mounted for lateral movement on one end of a switch operating lever 81 pivotally mounted at 83 for movement in a plane paralleling the plane of the frame member 10.

At this juncture it is to be made clear that no claim is made to the electrical means per se for controlling the operations of the three motors 32, 20 and 52 of our invention; accordingly the circuitry of said electrical means is not disclosed in this application. Furthermore no claim is made to the double acting motors 20, 32 and 52 all of which are alike; as are the solenoid operated valves of said motors. These valves are mounted on one end of the motors; and the power fluid, preferably air, fed to said motors by way of the valves is brought in by means of the conduits disclosed in Figure 1.

Continuing the description of the cycle of operations of the mechanism of our invention, with the parts of said mechanism in the full line positions disclosed in Figure 1 the attendant will close an on and off starter switch, not shown; and with this operation a solenoid valve unit 85 is operated to energize the motor 32 resulting in the mandrel 40 being moved by the piston 36 downwardly to pick up the workpiece, that is the spring 37. In this operation, as is disclosed in Figure 2, the lower end portion of the mandrel 40 is moved into the coils of the spring 37 to frictionally engage the same; and the crank arm 80, with the large diametered portion of the mandrel leaving the same, is rotated by a spring, not shown, back to its at rest position. In this downward movement of the piston and mandrel the upper end of an angular shaped rod 86 connected to the mandrel operates to close a part of a normally open switch mechanism 88 secured to the cylinder 34; and this results, through the intermediary of the operation of the solenoid valve 85, in an energization of the motor 32 to return the piston 36 to its upper dotted line position in Figure 1. In this operation the mandrel, with the spring 37 frictionally held on the end thereof, moves upwardly to remove said spring from the orientor member; and the top end of the mandrel strikes the arm 80 to angularly move the lever 81 about its pivot 83 to close a fixedly mounted normally open switch 90. The closing of this switch 90 results in an operation of a solenoid valve 92 to energize the motor 20; and this operation results in a retraction of the piston 24 of said motor to bodily move to the left, Figure 1, the three-part frame structure 10, 12, 14 and the motors 32 and 52 and their valves mounted thereon. At the tail end of this operation the thrust member 78 strikes an arm 94 of the lower lever of the linkage 76 to actuate the escapement mechanism to again fill the orientor 48 with another spring 37; and this operation of filling the orientor with a spring is facilitated by the presence of the notch 66 in the bar 64 which registers with the bore of the orientor 48 at the tail end of the leftward movement of the frame.

The aforementioned operation results in a bodily movement of the motor 32 to the straight up position shown in dotted lines in Figure 1, the mandrel and its spring being then in line with a hole 96, Figure 2, in the web 98 of a brake shoe 100. This brake shoe constitutes a part of a brake unit including a backing plate 101. The remaining parts of this brake unit are not disclosed herein inasmuch as our invention is concerned only with the power operated mechanism for incorporating within the unit a hold-down spring and its anchor member. Now at the tail end of the leftward movement of the frame structure the thrust member 82 serves to close a fixedly mounted normally open switch 102 thereby again operating the solenoid valve 85 to effect another energization of the motor 32 to move its power element 36 downwardly. In this operation a large portion of the spring 37 on the end of the mandrel passes through the hole 96 the large diametered coils of said spring remaining on top of the web and the smaller diametered coils passed through the hole being stretched to somewhat elongate the spring. In this operation, at the lower end of the stroke, a second part of the switch 88 is closed thereby resulting in an operation of a solenoid valve 104, said valve controlling the motor 52. The latter is then energized to rotate the frame member 10 and its motor 32 about the pivot 16 to one of the dotted line positions disclosed in Figure 1. The extended axis of the pivot 16 preferably passes through the plane of the web 98.

Now at the end of the leftward movement of the piston 54 in this tilting operation of the motor 52 a normally open fixedly mounted switch 106 is closed to operate a solenoid operated valve 108; and this operation results, by means of the electrical circuitry not shown and not claimed, in an energization of a double acting fluid pressure motor 110 fixedly mounted on a standard 112. The piston, not shown, of the motor 110 is moved upwardly to move the top portion 111 of an anchor member 114 through an opening 116, Figure 2, in the backing plate 101 of the brake 100. This top portion 111 has an opening or eye portion 113 therein adapted to receive the hook shaped end portion 77 of the spring 37. The base portion of the member 114 is preferably shaped to fit within a recess in a platform member 118 mounted on the end of the piston rod 120 of the motor 110; and these parts, including the portion 111 of the anchor, are so shaped and positioned that with the anchor inserted in the opening 116 the portion 111 lies in a plane which is at right angles to the plane of the lower portion of the frame member 10.

When the piston of the motor 110 reaches the top of its stroke, that is when the anchor 114 is positioned in place in the backing plate, a portion of an angular shaped rod 122 secured to the platform member 118 operates to close a fixedly mounted normally open switch 124; and this operation results, by virtue of the electrical controls not shown and not claimed, in a retract operation of the motor 52 to couple together the spring hook 77 and the anchor, said hook passing through the aligned opening 113 in the anchor. This retract operation of the motor 52 results in a closing of normally open, fixedly mounted switches 126 and 128, the same being actuated by a switch operating member 130 fixedly mounted on the rod 58; and the closure of one of the latter switches resulting in an energization of the motor 32 to move the mandrel 40 upwardly leaving the spring 37 in tension to hold the brake shoe 100 against the backing plate 101. This upward movement of the mandrel serves to close a fixedly mounted normally open switch 132 resulting in an energization of the motor 20 to return the frame structure to the right to its full line position of Figure 1. As to this operation of the switch 132 a projection 134 on the rod 86 strikes a switch operating spring 136 of the switch 132; and it is to be remembered that in this rightward movement of the frame the bar 64 serves to orient the spring then positioned in the orientor, that is the spring to be processed in the next cycle of operations of the mechanism. The closure of the other of the switches 126 and 128 results in an energization of the motor 110 to move the platform 118 downwardly.

The cycle of operations of the mechanism is thus completed, a brake shoe hold-down spring 37 and anchor 114 having been incorporated in the brake unit there being no manual operations required except to fill the hopper 44 with spring units and operate the start and stop switch mechanism of the electrical controls. Incidentally the automatic power operated mechanism of our invention is preferably associated with power means for moving the brake shoes 100 and backing plate 101 into position, Figure 1, in which case the electrical means for controlling the mechanism of our invention is not operative until a brake shoe is in position on support means, now shown, in Figure 1. This safety feature is effected by the incorporation of a normally open fixedly mounted switch 140, Figure 1, which is closed when the brake shoe is in position.

While the preferred embodiment of the invention has been described in considerable detail, we do not wish to be limited to the particular construction shown which may be varied within the scope of the invention, and it is the intention to cover hereby all adaptations, modifications and arrangements thereof which come within the practice of those skilled in the art to which the invention relates.

We claim:

1. A power operated mechanism for incorporating a hold-down spring and an anchor unit in a brake unit said brake unit comprising a brake shoe having a web portion and further comprising a backing plate lying in a plane parallel or substantially parallel to the plane of said web portion, said mechanism comprising a frame structure provided with first, second and third members which are bodily movable as a unit, said first member being pivotally mounted on said second member and said third member being fixed to said second member, a fixedly mounted hold-down spring receiving chute mounted adjacent the frame structure, a spring receiving orientor member secured to the base of the chute, a motor mounted on said first member of the frame structure and operatively connected to mandrel means operative to pick-up a spring from the orientor member, a fixedly mounted motor having its power element connected to said second member of the frame structure and operative to bodily move said frame structure after the mandrel means has picked up a spring, a motor fixedly mounted on said second member for angularly moving the first member to facilitate both the operation of positioning an anchor member in an opening in the backing plate and the operation of coupling the anchor member with the spring, a motor for bodily moving a portion of the anchor member into said opening in the backing plate preparatory to interconnecting the spring with said anchor member, and electrical means, including switches actuated by portions of the motor or parts connected thereto, for controlling the operation of said motors.

2. A power operated mechanism for incorporating a hold-down spring and an anchor unit in a brake unit, said brake unit comprising a brake shoe having a web portion and further comprising a backing plate lying in a plane parallel or substantially parallel to the plane of said web portion, said mechanism comprising a frame structure provided with first, second and third members which are movable as a unit, a fixedly mounted hold-down spring receiving chute mounted adjacent the frame structure, a spring receiving orientor member, comprising a cup-like member, secured to the base of the chute, a double acting fluid pressure operated motor mounted on said first member of the frame structure and operatively connected to mandrel means operative to pick up a spring from the orientor member and later insert said spring in an opening of the web portion of the brake shoe, a fixedly mounted double acting fluid pressure operated motor operatively connected to said second member of the frame structure and operative to bodily move said frame structure after the mandrel means has picked up a spring, a double acting fluid pressure operated motor for angularly moving the first member to facilitate both the operation of positioning an anchor member in an opening in the backing plate and the operation of coupling the anchor member and the spring together, a double acting fluid pressure operated motor for bodily moving a portion of the anchor member into said opening in the backing plate preparatory to interconnecting the spring with said anchor member, and electrical means, including switches actuated by portions of the motor or parts connected thereto, for controlling the operation of said motors.

3. A power operated mechanism for incorporating a hold-down spring and an anchor member in a brake, said brake comprising a brake shoe having a web portion and further comprising a backing plate lying in a plane parallel or substantially parallel to the plane of the web portion, said mechanism comprising a movable frame structure including first and second members, a fixedly mounted chute member having secured to its bottom portion a spring receiving cup-shaped member, a motor mounted on said first member, said first member being pivotally connected to said frame structure and said motor being operative, by means of a mandrel member connected to the power element of the motor, to pick up a spring housed within the cup-shaped member, a fixedly mounted motor for bodily moving the frame structure including said first and second members as a unit in the operation of positioning a spring above an opening in the web portion of the brake shoe, a motor for angularly moving the first member to facilitate the operation of connecting the spring with an anchor member placed in the backing plate, and a motor for bodily moving said anchor member so that a portion thereof moves through an opening in the backing plate preliminary to the operation of interconnecting said anchor member and spring.

4. A power operated mechanism for incorporating a hold-down spring and an anchor member in a brake, said brake comprising a brake shoe having a web portion and further comprising a backing plate lying in a plane parallel to the plane of the web portion, said mechanism comprising a movable frame structure including a relatively long rectangularly shaped support member, an angle iron shaped support member and a relatively short rectangularly shaped support member, a fixedly mounted chute member having secured to its bottom portion a spring receiving cup-shaped member, a motor mounted on said second named support member, said second named support member being pivotally connected to said first named support member, said motor being operative, by means of a mandrel member connected to the power element of said motor, to pick up a spring housed within the cup-shaped member, a fixedly mounted motor for bodily moving the frame structure including said first, second and third named support members as a unit in the operation of positioning a spring above an opening in the web portion of the brake shoe, a motor, mounted on the relatively short rectangularly shaped portion of the frame structure, for angularly moving the second named support member to facilitate the operation of connecting the spring with an anchor member placed in the backing plate, and a motor for bodily moving said anchor member so that a portion thereof moves through an opening in the backing plate preliminary to the operation of interconnecting said anchor member and spring.

5. A power operated mechanism for incorporating tubular shaped coil springs and anchor members in a brake as a part of the operation of assembling the parts of the brake as a unit, said brake including brake shoes each having a web portion and also including a backing plate lying in a plane parallel or substantially parallel to said brake shoe webs, said mechanism comprising a movable frame structure including a first support member and a second support member pivotally connected to said first support member, a fixedly mounted chute for receiving the aforementioned coil springs, a spring receiving orientor member secured to the base of the chute, a motor mounted on said second support member and having its power element operatively connected to mandrel means which is operative to withdraw a spring from the orientor member, a fixedly mounted motor having its power element operatively connected to said first support member and operative to bodily move said frame structure as a unit after the mandrel has picked up a spring, a motor for angularly moving the second support member to facilitate the operation of positioning the anchor member in an opening in the backing plate, a motor for bodily moving the anchor member into the latter opening preparatory to interconnecting the spring with the anchor member, and orienting means connected to said first support member and operative, when the frame structure moves in a certain direction, to rotate the spring about its longitudinal axis and thereby position the spring to facilitate its being coupled with the anchor member.

6. A power operated mechanism for incorporating tubular shaped coil springs and anchor members in a brake as a part of the operation of assembling the parts of the brake as a unit, said brake including brake shoes each having a web portion and also including a backing plate lying in a plane parallel or substantially parallel to said brake shoe webs, said mechanism comprising a movable frame structure including a first member, a second member pivotally connected to said first member and a third member fixedly secured to said first member, a fixedly mounted chute for receiving the aforementioned coil springs, a spring receiving orientor member secured to the base of the chute, a double acting motor mounted on said second member and having its power element operatively connected to mandrel means which is operative to pick up a spring from the orientor member and later insert said spring in an opening of the web portion of the brake shoe, a fixedly mounted motor having its power element operatively connected to said first member and operative to bodily move said frame structure including said first, second and third members as a unit after the mandrel has picked up a spring, a double acting motor mounted on said third member and having its power element operatively connected to said second member for angularly moving the second member to facilitate the operation of positioning an anchor member in an opening in the backing plate and to effect the interconnection of the anchor member and spring, a double acting motor for bodily moving the anchor member into the latter opening preparatory to interconnecting the spring with the anchor member, and orienting means connected to said first member and operative, when the frame structure moves in a certain direction, to rotate the spring about its longitudinal axis and thereby position the spring to facilitate its being coupled with the anchor member.

7. A power operated mechanism for incorporating a hold-down spring and an anchor member in a brake, said mechanism comprising a three-part frame structure movable as a unit toward and away from the brake, a fixedly mounted spring receiving chute and a spring receiving cup-shaped member secured to the base portion of said chute, power operated spring processing means mounted on a first part of the three-part frame structure and operative in part to remove the springs from the cup-shaped member, power means for bodily moving the three-part frame structure with its attached processing means toward the brake preparatory to incorporating the spring in the brake and for returning said structure to its off position, and means mounted in part on a second part of the three-part frame structure and in part on the base portion of the chute and operative to orient the spring when the power means is operative to return the frame structure to its off position.

8. A power operated mechanism for incorporating a hold-down spring and an anchor member in a brake, said mechanism comprising a three-part frame structure movable as a unit toward and away from the brake, a fixedly mounted spring receiving chute and a spring receiving cup-shaped member secured to the base of said chute, spring processing means, including a double acting motor and a mandrel member secured to the power element of said motor, mounted on a first part of said three-part frame structure and operative to remove the springs from the cup-shaped member, power means for bodily moving the three-part frame structure toward the brake preparatory to incorporating the spring in the brake, means including a notched bar member frictionally contactible with the spring housed in the cup-shaped member and operative to orient the spring when the power means is operative to return the spring processing means to its off position, and means mounted on a second part of said three-part frame structure and operatively connected to said first part for angularly rotating said first part to facilitate the operation of connecting the spring with an anchor member.

9. A mechanism for incorporating, in a brake unit, cylindrically shaped coil springs and anchor members, said mechanism including a three-part frame structure bodily movable as a unit, means for in part supporting said unit and guiding the same during its movement, a fixedly mounted chute member mounted adjacent said frame structure and operable to receive the springs and guide the same toward a certain part of the mechanism, said part consisting of an orientor mechanism fixed to the chute member, power operated means including a pressure differential operated double acting motor mounted on a first part of said three-part frame structure and having a part thereof operative to move into the orientor member to pick up a spring therein, fixedly mounted power means for bodily moving, as a unit, the frame structure and the power operated means mounted thereon, to the position to perform the aforementioned spring pick-up operation, means mounted on a second part of the three-part frame structure and cooperating with the orienting mechanism and with a stop member mounted on the orientor mechanism, for rotating the spring in the orientor mechanism about its longitudinal axis said operation being effected when the frame structure is bodily moved as indicated above, and power means mounted on a third part of said three-part frame structure and having a power element connected to said first part for angularly rotating said first part to facilitate the operation of connecting the spring with an anchor member.

10. A mechanism for incorporating, in a brake unit, cylindrically shaped coil springs and anchor members, said mechanism including a frame structure bodily movable as a unit and provided with a first part pivotally secured to a second part and a third part fixedly secured to the second part, means for in part supporting said unit and guiding the same during its movement, a chute member fixedly mounted adjacent said frame structure and operable to receive the springs and guide the same toward a certain part of the mechanism, said part consisting of a cup-shaped orientor member fixed to the chute, power operated means including a pressure differential operated double acting motor mounted on said first part of the frame structure and operative to move into the orientor member to pick up a spring therein, fixedly mounted power means including a pressure differential operated double acting motor for bodily moving the frame structure and the power operated means mounted thereon to the position to perform the aforementioned spring pick-up operation; and means mounted on said second part of the frame structure and cooperating with a stop member mounted on the orientor member, for rotating the spring in the orientor member about its longitudinal axis, said operation being effected when the frame structure is bodily moved as indicated above.

11. A mechanism for incorporating a hold-down spring and an anchor member in a brake including a brake shoe comprising a web and including a backing plate, said mechanism including a three-part frame, a fixedly mounted hold-down spring receiving chute mounted adjacent the frame, a cup-shaped orienting mechanism mounted on one end of the chute means including a mandrel member and a double-acting motor connected to the mandrel member mounted on a first part of the frame, for removing from the orienting mechanism a spring to be processed, fixed motor means having a power element operatively connected to a second part of the frame for bodily moving the frame so that the spring removed from the orienting mechanism may be positioned over the web of the brake shoe, said double-acting motor then being energized to actuate said mandrel member and the spring carried thereby into an opening in said web, motor means mounted on a third part of said frame member with its power element operatively connected to said first part for actuating the same angularly relative to said web so that the anchor member may be inserted in an opening in the backing plate and later coupled with the spring; means for moving the anchor member into the latter opening and means comprising a rectangular shaped member secured to a second part of the frame, a slotted portion of the orienting mechanism for receiving therein the latter member, and two roller members constituting part of the orienting mechanism, for rotating the spring about its longitudinal axis to a certain position, said rotation of the spring being effected when the frame is moved in a certain direction.

12. A mechanism for incorporating a spring member and an anchor member in a brake having a brake shoe and a backing plate, said mechanism including a three-part frame, a fixedly mounted spring receiving chute mounted adjacent the frame, a cup-shaped orientor member mounted on one of the chute, means mounted on a first part of the frame for removing from the orientor member a spring to be processed, means comprising two double acting pressure differential operated motors mounted on second and third parts respectively, of the frame for bodily moving the frame so that the spring removed from the orientor may be positioned over a certain part of the brake shoe, then inserted in an opening in said latter part, and then moved so that the anchor member may be inserted in the backing plate and later coupled with the spring; means comprising a double acting pressure differential operated motor for moving the anchor member into an opening in the backing plate, and means comprising a rectangularly shaped bar member secured to said second part of the frame, a slotted portion of the orientor member for receiving therein the latter member, and two roller members mounted on the orientor member and contactible with the spring, for rotating the spring about its longitudinal axis to a certain position, said rotation of the spring being effected when the frame is moved in a certain direction and for the purpose of positioning the spring to facilitate its being coupled with the anchor member in other operations of the mechanism.

13. A mechanism for inserting, into an automotive brake unit, an anchor member and a tubular shaped spring having a hook shaped portion at its lower end adapted to fit within a portion of the anchor member, said mechanism comprising a movable frame, a motor mounted on the movable frame, a spring receiving chute fixedly mounted adjacent the frame, a spring receiving orientor mechanism secured to the lower end of the chute, means connected to the power element of the aforementioned motor and operable, with an energization of said motor, to remove a spring from the orientor mechanism, a fixedly mounted motor having its power element operably connected to the frame and operable to bodily move the frame with its aforementioned motor to a position adjacent the brake unit and, after certain operations of the mechanism, bodily return the frame to its original position adjacent the chute, another motor mounted on the frame and operably connected to said spring removing means for tilting the same and the spring carried thereby relative to said anchor member to facilitate coupling said hook shaped portion of the spring with said portion of the anchor member; and means, mounted in part on the orientor mechanism and in part on the frame, for rotating to a certain position a spring housed within the orientor mechanism, said operation being effected to orient the spring with its hook to a certain position to facilitate its being coupled with the anchor member.

References Cited in the file of this patent

UNITED STATES PATENTS

| Number | Name | Date |
|---|---|---|
| 1,951,953 | Tollonitsch | Mar. 20, 1934 |
| 2,329,591 | Christian | Sept. 14, 1943 |
| 2,334,884 | Peterson | Nov. 23, 1943 |
| 2,428,182 | Stark | Sept. 30, 1947 |
| 2,457,766 | Young | Dec. 28, 1948 |
| 2,529,599 | Dick | Nov. 14, 1950 |
| 2,623,274 | Henchert | Dec. 30, 1952 |